United States Patent Office 2,731,141
Patented Jan. 17, 1956

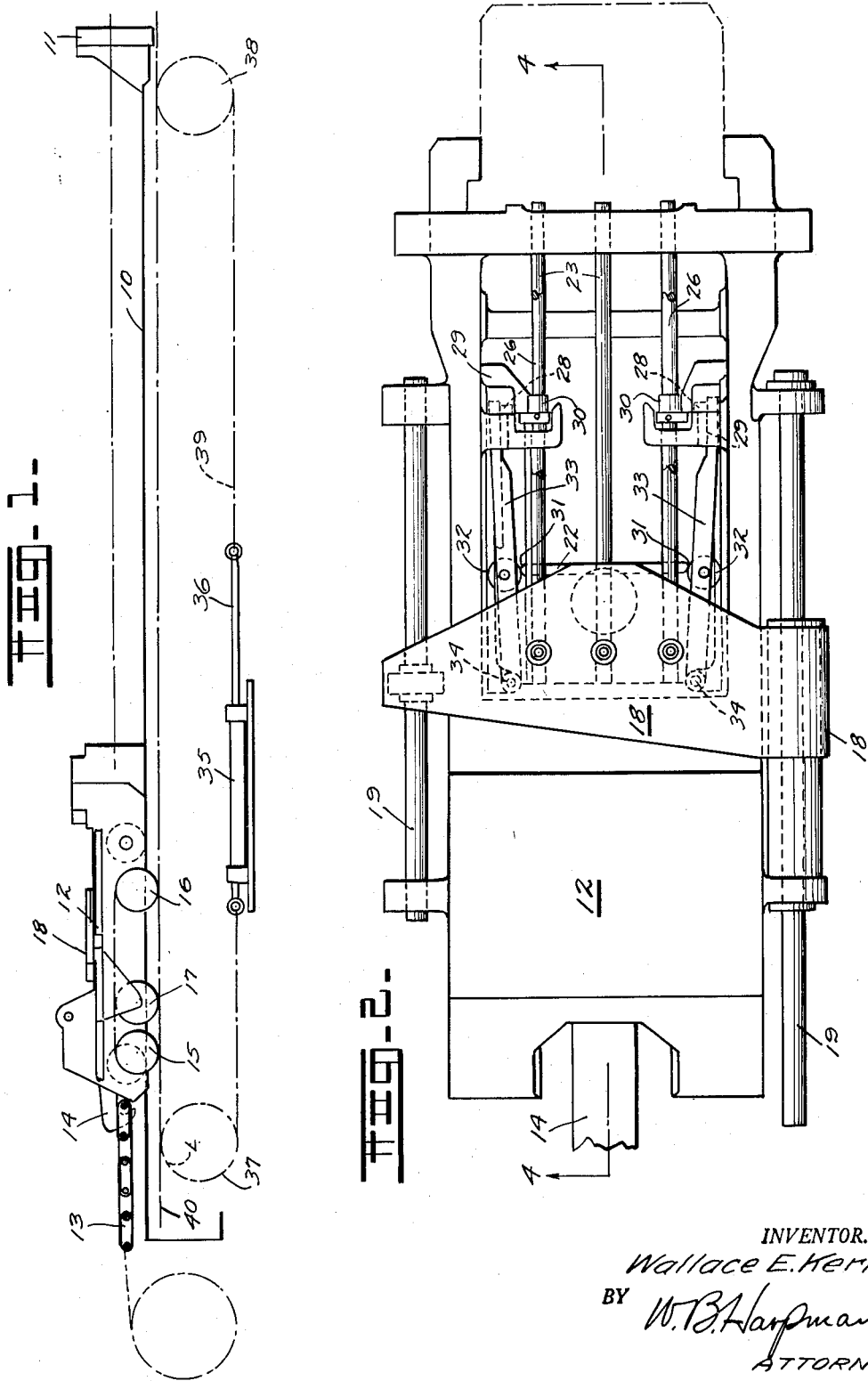

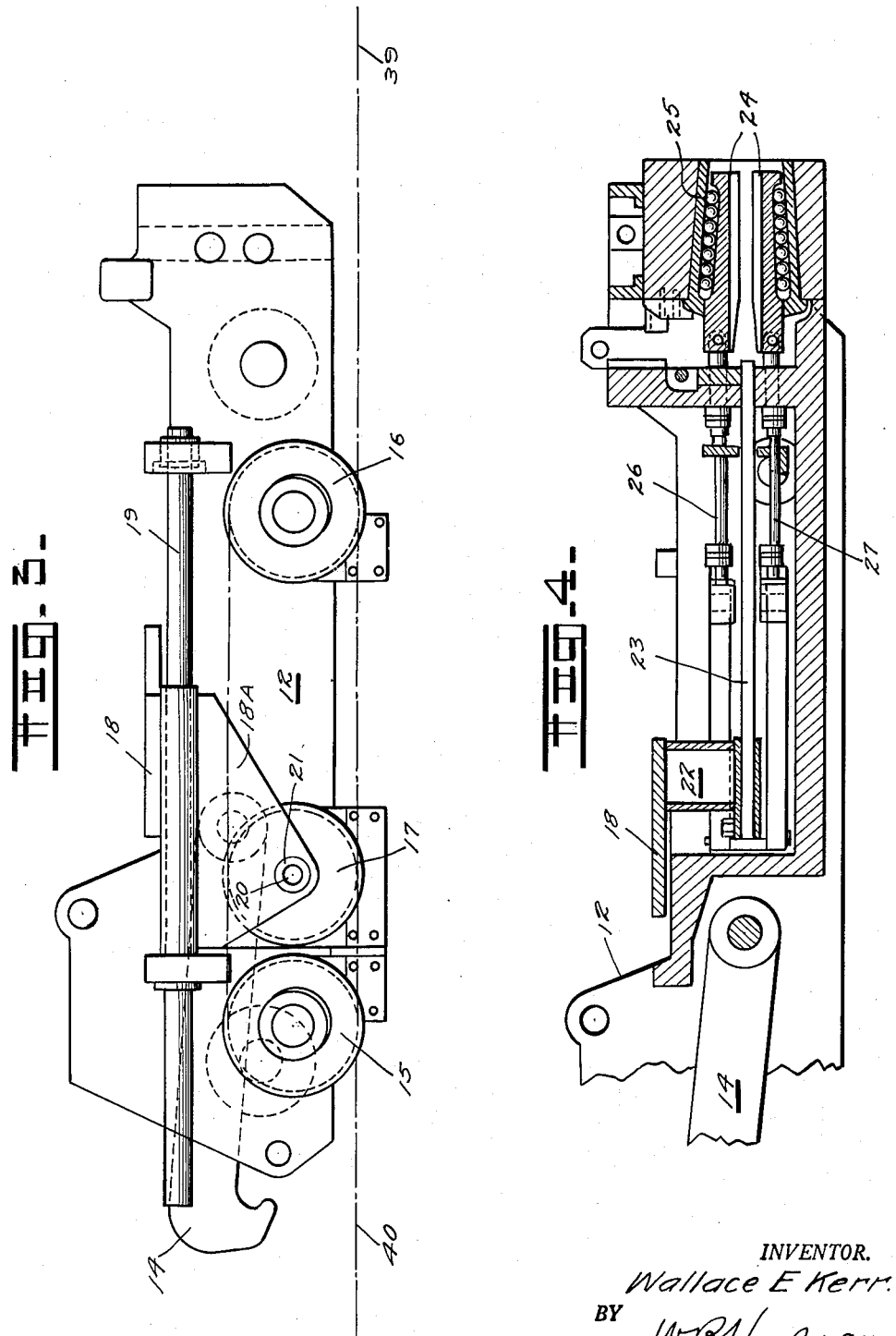

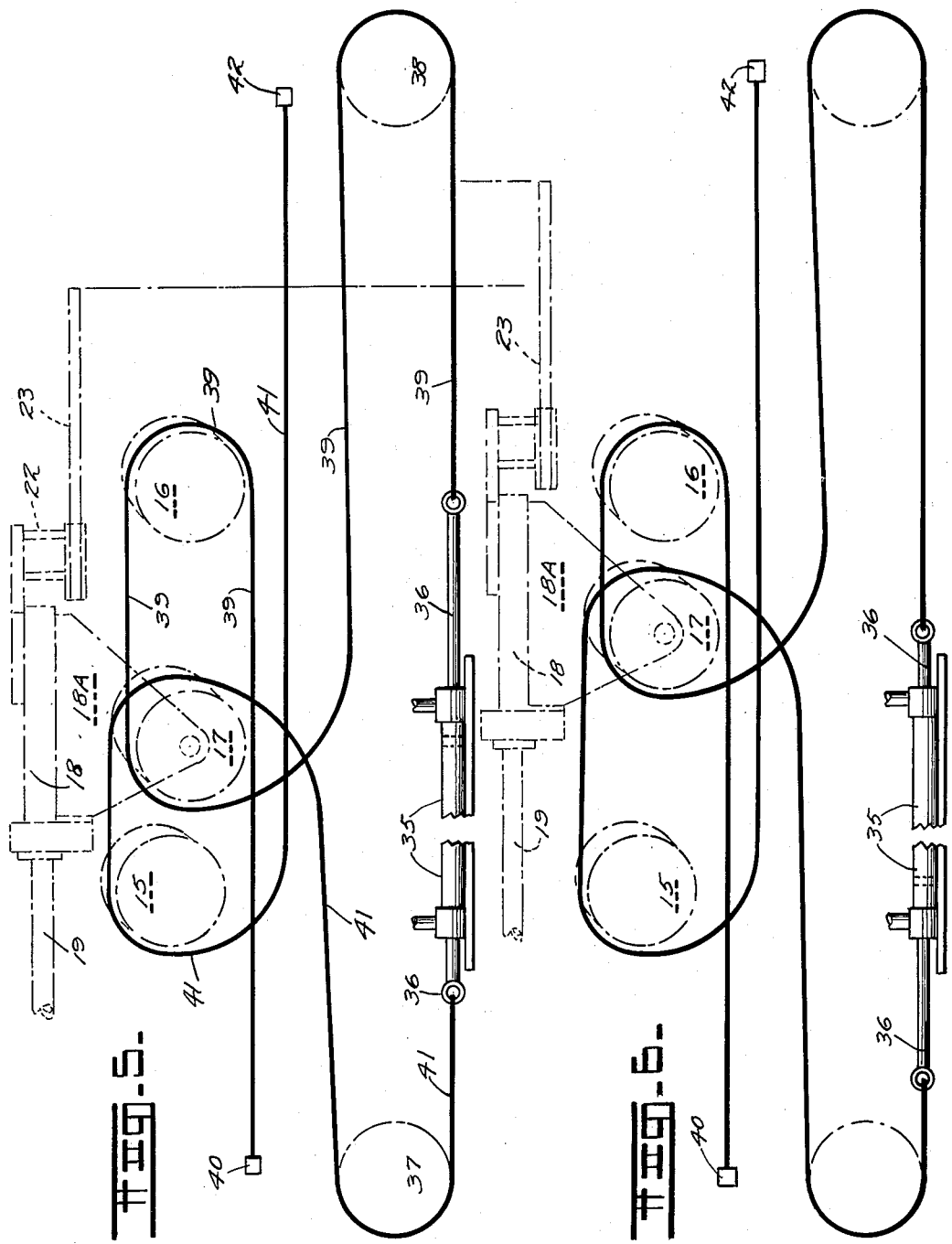

2,731,141

GRIP BUGGY AND EJECTOR FOR DRAW BENCHES

Wallace E. Kerr, Poland, Ohio

Application April 16, 1952, Serial No. 282,649

9 Claims. (Cl. 205—24)

This invention relates generally to draw benches and more particularly to the grip buggies used on draw benches for pulling metal objects through the dies thereof and specifically to an ejector mechanism formed on a grip buggy for disengaging metal objects from the same.

The principal object of the invention is the provision of an improved grip buggy for a draw bench incorporating remotely controllable means for ejecting work pieces from the gripping portions of the grip buggy.

A further object of the invention is the provision of a grip buggy for a draw bench incorporating means for moving the work piece gripping portions thereof to closed or gripping position and to open position and including means for locking the work piece gripping means in open position, said means being operated by an ejector mechanism formed on the grip buggy and principally usable in ejecting work pieces from the gripping means when the same are open.

A still further object of the invention is the provision of a draw bench having a grip buggy movable therealong and incorporating means for gripping a work piece to be drawn on the draw bench and incorporating ejecting means capable of being moved when the grip buggy is in stationary position as well as in motion on the draw bench.

The improvement in draw bench constructions disclosed herein relates primarily to the grip buggy as used on the draw bench for gripping metal objects in pulling them through the dies of the draw bench to desirably reduce the metal objects or desirably shape the same. The grip buggies known in the art include means engageable with the work piece or metal object to be drawn for establishing connection therewith through frictional engagement against the sides thereof, the gripping means being generally known as grip bits and arranged, as also known in the art, for longitudinal movement in the grip buggy within a tapered member so that longitudinal movement of the grip bits results in their movement toward or away from each other thus enabling an efficient grip to be had on the work piece which avoids mutilating the same as is also desirable.

The formation of such grip bits and their arrangement in the tapered member results in their forcible engagement with the work piece and the need of an auxiliary device for ejecting the work piece from the grip bits when it is desired to release the grip buggy from the work piece as at the conclusion of a drawing operation.

The present invention therefore relates specifically to an ejector mechanism, the principal portion of which is incorporated in the grip buggy and which acts to lock grip bits in open position and to eject a work piece from the grip bits to free the grip buggy and its mechanisms completely therefrom. The apparatus is so designed that the ejecting operation may take place by remote control at any location along the draw bench, and whether the grip buggy is stationary or moving along the draw bench, the motivating force for the operation comes from a servo-motor mounted on the draw bench and capable of remote control. Flexible cables connect the servo-motor and the grip buggy apparatus to energize the same, as hereinafter set forth.

Those skilled in the art will observe that by equipping a draw bench with the grip buggy ejector disclosed herein, a single operator may operate the draw bench efficiently and without the necessity of making frequent trips to the grip buggy to release the grip bits from the work piece as has heretofore been necessary, thereby increasing the actual capacity of the draw bench and the efficiency of the operation. It will also occur to those skilled in the art that the grip buggy ejector disclosed is equally efficient on a grip buggy having grip bits arranged for holding and drawing one work piece or a plurality of work pieces.

The grip buggy ejector mechanism disclosed herein is adapted to be used with the grip buggy disclosed in my Patent No. 2,404,234 issued July 16, 1946 and my co-pending application Serial No. 740,133 in which a grip buggy of an improved form is disclosed and wherein means is provided for tensioning the grip bits to open and closed position, the means being controlled by the position of the hook of the grip buggy and its position with respect thereto. Such means being disclosed in the prior art, the same is not further illustrated or described herein.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a schematic side elevation of a draw bench illustrating the grip buggy ejecting means and actuating means for the ejecting means.

Figure 2 is a top plan view of the grip buggy in enlarged detail.

Figure 3 is a side elevation of the grip buggy.

Figure 4 is a vertical section taken on line 4—4 of Figure 2.

Figure 5 is a schematic view of the grip buggy ejector actuating mechanism showing the ejector in one position.

Figure 6 is a schematic view of the grip buggy ejector actuating mechanism showing the ejector mechanism in a different position from that shown in Figure 5.

By referring to the drawings and Figure 1 in particular it will be seen that a draw bench 10 has been disclosed with a die stand 11 at one end thereof and a grip buggy 12 movably positioned on the draw bench 10 for movement toward and away from the die stand 11. As known in the art, a motivating chain 13 is positioned longitudinally of the draw bench 10 and adapted to be moved therealong. The grip buggy 12 is provided with a hook 14 detachably engaging the chain 13 so that the grip buggy 12 may be moved along the draw bench 10 by the chain 13.

Still referring to Figure 1 of the drawings it will be observed that the grip buggy 12 is provided with a pair of spaced sheaves 15 and 16 and an intermediately positioned movable sheave 17. The movable sheave 17 is movable by reason of its mounting on a saddle 18 which in turn is slidably mounted on the grip buggy 12 as best seen in Figures 2 and 3 of the drawings.

In Figures 2 and 3 of the drawings the grip buggy 12 will be seen to be provided with a pair of transversely spaced, longitudinally extending guide rods 19—19 mounting and guiding the saddle 18 heretofore referred to which is positioned transversely of the grip buggy 12 over the upper surface thereof and has a depending side section 18A thereon to which the movable sheave 17 is secured by means of a stub shaft 20 and a retaining fastener 21.

The saddle 18 has a depending central portion 22 to which a plurality of ejector rods 23 are attached and which ejector rods 23 are positioned longitudinally of the grip buggy 12 and in axial alignment with the area between the grip bits 24 of the grip buggy, as best shown in Figure 4. The grip bits 24 are longitudinally movable in a wedge shaped opening 25 in the grip block section of the grip buggy 12, as shown in my co-pending patent application Serial No. 740,133 filed April 8, 1947, on Metal Drawing Apparatus, and are connected with longitudinally positioned actuating arms 26 and 27 which are adapted to be moved by the hook 14, all as set forth in the said patent application.

In the present disclosure, means has been added to the grip buggy disclosed in my said patent for latching the actuating arms 26 and 27 in position holding the grip bits 24 in open position where they are disengaged with respect to a workpiece. Said means comprises a pair of latches 28 movable transversely with respect to a pair of brackets 29 in which they are mounted and into position adjacent collars 30 positioned on the actuating arms 26 and 27 and which actuating arms it will be observed by referring to Figure 4 lie on common vertical planes with the ejector rods 23. A transverse portion of the depending member 22 has oppositely disposed, outwardly extending bosses 31 normally engaged against rollers 32 pivoted on spring tensioned arms 33, which arms 33 are pivoted by pivots 34 to the grip buggy 12 and have their opposite or outermost ends engaged in the latches 28 heretofore referred to. It will thus be seen that when the saddle 18 moves from left to right, or from its normal position to ejecting position, as shown in Figures 2 and 3, its initial action will be to effect the disengagement of the bosses 31 from the rollers 32 and permit the arms 33 to move the latches 28 toward one another and into engagement behind the shoulders 30 on the bit actuating arms 26 and 27 which will latch the bits 24 in open position. Further movement from left to right of the saddle 18 will cause the ejector rods 23 to move into the area between the bits 24 and engage work pieces therein and forcibly eject the same therefrom.

It will occur to those skilled in the art that the latching of the bits 24 in open position facilitates the ejecting action performed by the ejecting rods 23 in that there is no tendency of the bits 24 to move toward closed position, which motion would increase the tension on the work piece and render an ejecting operation difficult.

The means for moving the saddle 18 longitudinally of the grip buggy is illustrated in Figures 1, 5 and 6 and comprises a servo-motor 35 in the form of a hydraulic piston and cylinder assembly, the double acting piston being indicated by the numeral 36. The draw bench 10 incorporates a pair of spaced pulleys 37 and 38 and a cable 39 is connected to one end of the piston 36 and is trained over the pulley 38 and leads backwardly along the draw bench 10 to the grip buggy 12 where an upward loop is formed therein, the loop being positioned over the movable sheave 17 and the fixed sheave 16 with the flexible cable 39 extending on to the far end of the draw bench 10 where the same is secured to a stationary portion 40 thereof.

It will be observed that when the servo-motor 35 is actuated, the piston 36 will move longitudinally thereof from right to left, as shown in Figures 1, 5 and 6, which will effectively shorten the flexible cable 39 and specifically the loop therein trained over the sheaves 16 and 17 on the grip buggy which will cause the movable sheave 17 to move toward the fixed sheave 16 and thereby move the saddle 18 from left to right on the buggy. This movement results in the hereinbefore described latching and ejecting operations.

By referring to Figures 5 and 6 of the drawings the positions 2 of the saddle 18 and the movable sheaves 17 mounted thereon may be seen, it being observed that in Figure 5 the ejector rods 23 are in nonejecting position while in Figure 6 the same have been moved into ejecting position.

Still referring to Figures 1, 5 and 6 of the drawings it will be observed that the other end of the double acting piston 36 is attached to a secondary flexible cable 41 which is trained over a pulley 37 at the opposite end of the draw bench with respect to the pulley 38 and then led backwardly along the draw bench 10 and trained over the sheave 17 and the sheave 15 in the manner of a loop thereabout and then continues on to the opposite end of the draw bench where it is secured thereto at a point 42.

It will be observed that as the hereinbefore described action of the piston 36 takes place shortening the flexible cable 39 and moving the sheave 17 toward the sheave 16, the flexible cable 41 is, in effect, lengthened by a similar movement of the end of the piston 36 secured thereto thus permitting the loop in the flexible cable 41 passed about the sheaves 15 and 17 to be enlarged. In moving the ejecting mechanism including the saddle 18 and the ejecting rods 23 to non-ejecting position, the operation of the double acting piston 36 of the servo-motor is reversed and the flexible cable 41 is shortened thereby reducing the loop therein about the sheaves 15 and 17 and thus moving the ejector mechanism toward the sheave 15. Simultaneously, the cable 39 is lengthened so that the loop therein is expanded to permit the necessary separation of the sheaves 16 and 17.

It will thus be seen that by remotely controlling the action of the servo-motor, the ejector mechanism on the grip buggy 12 may be operated and retracted at any time whether the grip buggy is moving or stationary or at any position on the draw bench 10. Thus, various lengths of metal objects may be drawn by the grip buggy through the die stand as known in the art, and as soon as they have passed the die stand the ejecting mechanism may be operated to free the grip buggy and the bits 24 thereof from the metal object being drawn which will permit the same to fall free of the draw bench whereupon the grip buggy may be returned to the die stand end of the draw bench by means such as known in the art as set forth in my aforementioned patent.

It will thus be seen that the principal novelty in this disclosure resides in the formation of the ejector mechanism on the grip buggy 12, the ejector mechanism comprising the saddle 18 reciprocally mounted on the grip buggy 12 for longitudinal movement with respect thereto and includes the ejector rods 23 carried thereby for movement into and out of the area between the grip bits 24.

Those skilled in the art of draw bench operation will appreciate that the extreme tension necessary between the grip bits 24 and the metal article being drawn requires some positive means of ejecting the metal object being drawn from the grip bits and it will be apparent that the means herein disclosed will operate efficiently for such purpose and, in addition, may be conveniently and easily remotely controlled and will operate despite the location, motion or lack of motion of the grip buggy.

The actual freeing of the metal object being drawn from the grip bits occurs as a result of several forces exerted thereagainst and including the snap action of the metal object being drawn when the same is pulled through the die and the urging of the tensioning means incorporated in the grip buggy and actuating to move the grip bits away from the metal object being drawn.

The secondary point of novelty set forth herein comprises the latching operation of the grip bit controlling arms 26 and 27 which insures their retention in open position during the operation of the extractor which would otherwise drive the same into the wedge-shaped opening 25 in the grip block portion of the grip buggy 12.

It will thus be seen that the several objects of the invention may be achieved by the use of the grip buggy and ejector for draw benches disclosed herein.

Having thus described my invention, what I claim is:

1. In a draw bench a grip buggy having opposed wedge surfaces and grip bits mounted thereon and longitudinally movable along said opposed wedge surfaces for effecting lateral clamping of the stock to be drawn and movable in the opposite longitudinal direction to an open position to effect unclamping of the stock, stock ejecting means mounted on said grip buggy and movable into and through the stock space formed within said grip bits for ejecting stock therefrom, and means interconnecting said grip bits and said stock ejecting means including locking means for locking said grip bits in open position when said ejecting means moves into said space.

2. In a draw bench a grip buggy comprising a frame having a grip bit retaining portion at one end and a hook at the other end, said grip bit holding portion having at least one wedge shaped opening therein and a pair of grip bits positioned for longitudinal movement in said opening for engagement upon the opposite sides of stock to be drawn, arms positioned in said frame for longitudinal movement with respect thereto and controlling the position of said grip bits in said opening, latch members movable transversely of said frame for engagement with said arms, guide means on said frame, and a saddle slidably mounted on said guide means for longitudinal movement with respect to said frame, at least one ejector rod on said saddle for movement into and out of the area between said grip bits for engaging said stock and ejecting the same therefrom, and means for moving said saddle comprising a servomotor on said draw bench having a double ended piston therein, cables connected to the opposite ends of said double ended piston, pulleys at the opposite ends of said draw bench, said cables trained over said pulleys and extending along said draw bench to the opposite ends thereof and secured thereto at said opposite ends, a pair of longitudinally spaced sheaves on said grip buggy and a secondary sheave mounted on said saddle intermediate said pair of sheaves on said grip buggy, a loop formed in one of said cables and positioned over one of the pair of spaced sheaves and said secondary sheave and a loop formed in the other of said cables and positioned over the other of the pair of said sheaves on said buggy and over the said secondary sheave whereby motion of said piston acts to contract one of said loops and moves said saddle in one direction on said buggy and wherein movement of the piston in the opposite direction acts to contract the other of said loops to move said saddle in the opposite direction on said buggy.

3. In a draw bench a grip buggy having guide surfaces thereon, grip bits carried by said buggy and slidable along said guide surfaces into and out of engagement with a workpiece, an ejector mechanism movable longitudinally on said buggy and including elements movable into and out of the workpiece space formed between said grip bits for ejecting a workpiece therefrom, flexible cables extending along said draw bench, loops in said cables engaged over said buggy and ejector mechanism and means for moving said cables to tighten and loosen said loops to cause movement of said ejector mechanism relative to said buggy.

4. The improvement in draw benches set forth in claim 3 and wherein the means for moving said cables comprises a servomotor.

5. The improvement in draw benches set forth in claim 3 and wherein the means for moving said cables comprises a servomotor having a double ended piston, said cables being respectively attached to the opposite ends of said double ended piston.

6. In a draw bench a grip buggy having guide surfaces thereon, grip bits carried by said buggy and slidable along said guide surfaces into and out of engagement with a workpiece, a pair of sheaves on said grip buggy, an ejector mechanism slidable longitudinally on said grip buggy and including elements movable into and out of the workpiece space formed between said grip bits for ejecting a workpiece therefrom, a pair of sheaves on said ejector mechanism, a pair of flexible cables extending along said draw bench, each of which is attached at one end to said draw bench, a loop in one of said cables engaged over one of said sheaves on said buggy and one of said sheaves on said ejector mechanism, a loop in the other of said cables engaged over the other of said pair of sheaves on said grip buggy and the other of said pair of sheaves on said ejector mechanism, and means for moving said cables simultaneously in opposite directions to respectively tighten and loosen said loops to cause movement of said ejector mechanism relative to said buggy.

7. The improvement in draw benches set forth in claim 6 and wherein the means for moving said cables comprises a servomotor having a double ended piston, said cables being respectively attached to the opposite ends of said double ended piston.

8. Apparatus according to claim 3 and wherein the ejector mechanism comprises a saddle mounted on said grip buggy for longitudinal movement therealong and said elements movable between said grip bits are secured to said saddle in offset relation thereto.

9. Apparatus according to claim 3 and wherein the grip buggy has a pair of spaced parallel longitudinally extending guide rods and a pair of longitudinally spaced sheaves therein and the ejector mechanism includes a saddle slidably mounted on said guide rods, a portion of said saddle having a double sheave thereon, said portion of said saddle and said double sheave lying between said spaced sheaves and the flexible cables positioned over opposite pairs of said sheaves.

References Cited in the file of this patent

UNITED STATES PATENTS

| | | |
|---|---|---|
| 1,170,693 | Smith | Feb. 8, 1916 |
| 1,603,531 | Flaherty | Oct. 19, 1926 |
| 2,109,600 | Vanderbeek | Mar. 1, 1938 |
| 2,404,234 | Kerr | July 16, 1946 |
| 2,659,480 | Kreidler | Nov. 17, 1953 |